US007487030B2

(12) United States Patent
Heap et al.

(10) Patent No.: US 7,487,030 B2
(45) Date of Patent: Feb. 3, 2009

(54) METHOD AND APPARATUS TO OPTIMIZE ENGINE WARM UP

(75) Inventors: Anthony H. Heap, Ann Arbor, MI (US); John L. Lahti, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 110 days.

(21) Appl. No.: 11/737,211

(22) Filed: Apr. 19, 2007

(65) Prior Publication Data

US 2008/0262694 A1 Oct. 23, 2008

(51) Int. Cl.
*G06F 19/00* (2006.01)
*F02D 41/04* (2006.01)

(52) U.S. Cl. .................................... 701/103; 701/115

(58) Field of Classification Search .................. 701/54, 701/101–105, 114, 115; 123/350, 352
See application file for complete search history.

(56) References Cited

U.S. PATENT DOCUMENTS 4,719,025 A * 1/1988 Akiyama et al. ............ 508/499
6,416,437 B2 * 7/2002 Jung ............................ 475/8
6,959,241 B2 * 10/2005 Itow et al. .................. 701/102

* cited by examiner

*Primary Examiner*—Willis R. Wolfe, Jr.
*Assistant Examiner*—Johnny H. Hoang

(57) ABSTRACT

There is provided a method and an apparatus to minimize energy loss of an internal combustion engine during engine warm-up. This includes monitoring engine operating conditions, and estimating a future energy loss. A power loss and a rate of change in the estimated future energy loss are determined. An engine control scheme effective to minimize the power loss and the rate of change in the estimated future energy loss is executed during the engine warm-up.

18 Claims, 3 Drawing Sheets

METHOD AND APPARATUS TO OPTIMIZE ENGINE WARM UP

TECHNICAL FIELD

This invention pertains generally to control systems for powertrain systems.

BACKGROUND OF THE INVENTION

Powertrain control systems, including hybrid powertrain architectures, operate to meet operator demands for performance, e.g., torque and acceleration, which are balanced against other operator requirements and regulations, e.g., fuel economy and emissions. In order to optimize operation of the powertrain, there is a need to quantify engine power losses associated with operating conditions during ongoing operation.

Prior art systems to determine instantaneous engine power losses have relied upon pre-calibrated tables stored in an on-board computer to determine losses. These systems consume substantial amounts of computer memory and are often unable to accommodate variations in operating conditions. The memory space is further compounded when other engine operating modes, e.g., cylinder deactivation, are introduced.

There is a need to minimize overall energy consumption during engine warm-up. This includes a need for a system to rapidly and effectively determine engine power losses for engine operating conditions and engine control during ongoing operation, and to control engine operation based thereon. Such a system is now described.

SUMMARY OF THE INVENTION

In accordance with an embodiment of the invention, a method and an article of manufacture are provided comprising a storage medium having machine-executable code stored therein effective to minimize energy loss of an internal combustion engine during engine warm-up. This includes code to monitor engine operating conditions, and estimate a future energy loss. A power loss and a rate of change in the estimated future energy loss are determined. An engine control scheme operative to minimize the power loss and the rate of change in the estimated future energy loss are determined and executed during the engine warm-up.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
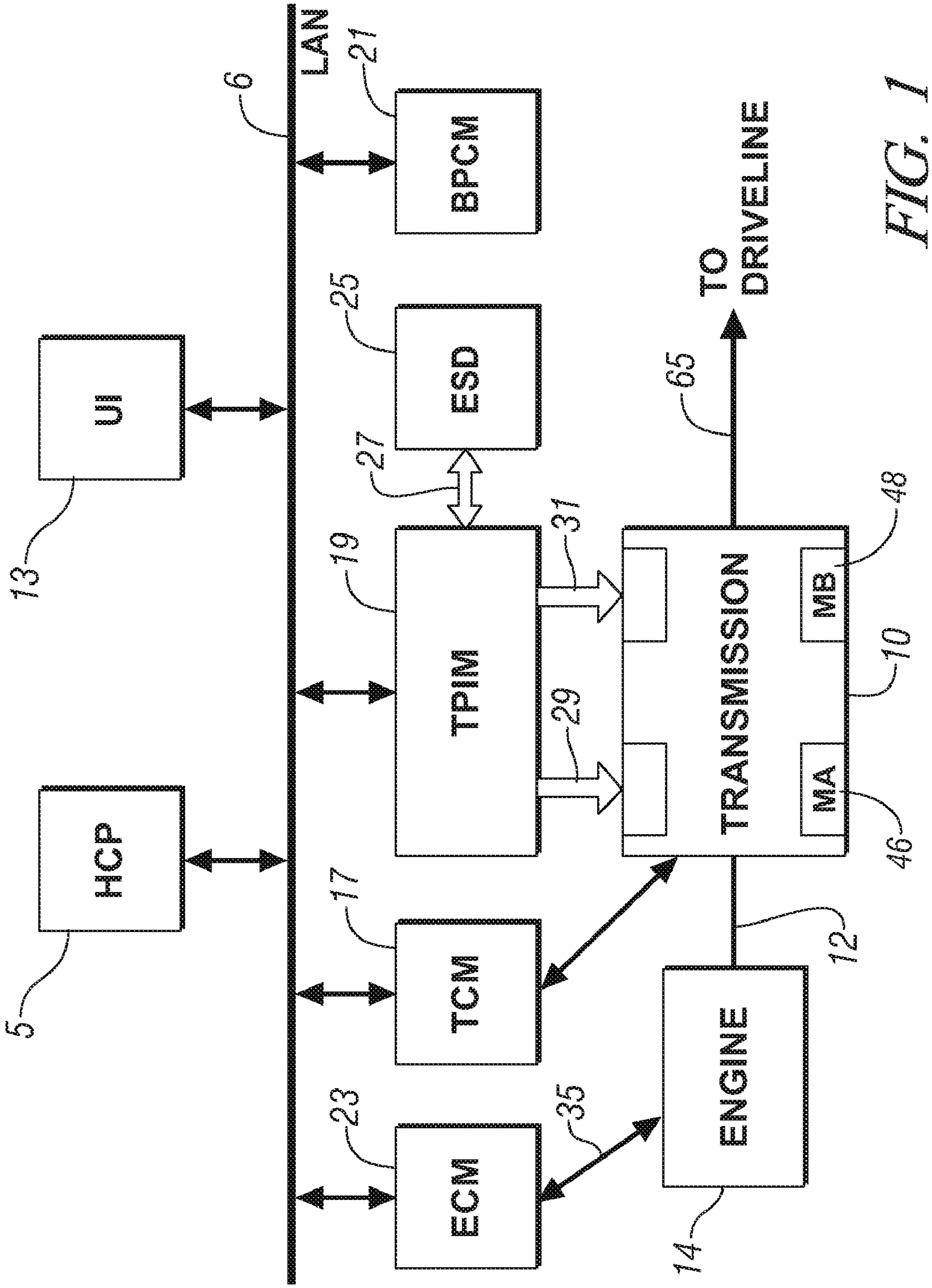
FIG. 1 is a schematic diagram of an exemplary architecture for a powertrain and a control system, in accordance with the present invention.

Referring now to the drawings, wherein the showings are for the purpose of illustrating the invention only and not for the purpose of limiting the same, FIG. 1 depicts a schematic diagram of a powertrain and control system illustrative of the invention. The elements described hereinafter provide coordinated control of the powertrain system. The powertrain comprises an internal combustion engine 14 and an electro-mechanical transmission 10 operative to provide a torque output to a driveline via an output shaft 65. The electromechanical transmission 10 includes a pair of electrical machines MA, MB 46, 48. The engine, transmission, and electrical machines are operative to transmit torque therebetween according predetermined control schemes and parameters not discussed in detail herein.

The exemplary internal combustion engine 14 comprises a multi-cylinder internal combustion engine selectively operative to transmit torque to the transmission via shaft 12, and can be either a spark-ignition or a compression-ignition engine. The engine is selectively operative in a plurality of operating modes and engine states. The engine operating modes include an air/fuel ratio operation comprising one of a stoichiometric operating mode and a rich operating mode. On a system employing a compression-ignition engine, there may be an additional or alternative mode comprising a lean operating mode. The engine operating modes include an engine temperature management mode comprising a warm-up mode and a warmed-up mode, typically based upon engine coolant temperature. The warm-up mode typically includes retarding spark timing (or fuel injection timing) during initial engine operation to increase heat transfer to the engine during combustion to increase heat transfer from combustion to the aftertreatment system. Exemplary engine states comprise normal engine operation ('ALL_CYL'), and engine operation with deactivated cylinders ('DEACT'). In normal engine state, all the engine cylinders are fueled and fired. In cylinder deactivation state, typically half of the cylinders, e.g., one bank of a V-configured engine, are deactivated. A bank of cylinders is typically deactivated by discontinuing fuel injection thereto.

The engine includes an exhaust aftertreatment system (not shown) operative to oxidize and/or reduce engine exhaust gas feedstream constituents to inert gases. Operating temperature(s) of the exhaust aftertreatment system are critical, as temperatures that are too low can result in inefficient conversion of regulated exhaust gas constituents, e.g., hydrocarbons HC, carbon monoxide CO, nitrides of oxygen $NO_x$, and particulate matter PM. Excessive temperatures can damage aftertreatment components, especially a catalyst. Engine control and operating schemes include causing non-optimal engine operation to control exhaust gas feedstream temperatures and constituents, to either increase or decrease temperature of the aftertreatment system. This includes operation to effectively light-off the aftertreatment system, i.e., induce exothermic reactions therein. Therefore, there can be power losses or inefficiencies associated with engine emissions.

In the embodiment depicted, the transmission 10 receives input torque from the torque-generative devices, including the engine 14 and the electrical machines MA, MB 46, 48 as a result of energy conversion from fuel or electrical potential stored in an electrical energy storage device (ESD) 25. The electrical machines MA, MB 46, 48 each comprise a three-phase AC electrical machine having a rotor rotatable within a stator. The ESD 25 is high voltage DC-coupled to a transmission power inverter module (TPIM) 19 via DC transfer conductors 27. The TPIM 19 is an element of the control system. The TPIM 19 transmits electrical energy to and from MA 46 by transfer conductors 29, and the TPIM 19 similarly transmits electrical energy to and from MB 48 by transfer conductors 31. Electrical current is transmitted to and from the ESD 25 in accordance with whether the ESD 25 is being charged or discharged. TPIM 19 includes the pair of power inverters and respective motor control modules configured to receive motor control commands and control inverter states therefrom for providing motor drive or regeneration functionality.

The control system synthesizes pertinent information and inputs, and executes algorithms to control various actuators to achieve control targets, including such parameters as fuel economy, emissions, performance, driveability, and protection of hardware, including batteries of ESD 25 and MA, MB 46, 48. The exemplary embodiment, there is a distributed control module architecture including an engine control module ('ECM') 23, a transmission control module ('TCM') 17, battery pack control module ('BPCM') 21, and the TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21, based upon various input signals from the UT 13 and the powertrain, including the battery pack. The ECM 23 is operably connected to the engine 14, and functions to acquire data from a variety of sensors and control a variety of actuators, respectively, of the engine 14 over a plurality of discrete lines collectively shown as aggregate line 35. Sensing devices (not shown) operative to monitor engine operation typically comprise a crankshaft sensor, a manifold absolute pressure (MAP) sensor, and, a coolant temperature sensor, among others. The TCM 17 is operably connected to the transmission 10 and functions to acquire data from a variety of sensors and provide command signals to the transmission, including monitoring inputs from pressure switches and selectively actuating pressure control solenoids and shift solenoids to actuate various clutches to achieve various transmission operating modes. The BPCM 21 is signally connected to one or more sensors operable to monitor electrical current or voltage parameters of the ESD 25 to provide information about the state of the batteries to the HCP 5. Such information includes battery state-of-charge ('SOC'), battery voltage and available battery power.

Each of the aforementioned control modules preferably comprises a general-purpose digital computer generally including a microprocessor or central processing unit, storage mediums comprising random access memory (RAM), non-volatile memory, e.g., read only memory (ROM) and electrically programmable read only memory (EPROM), a high speed clock, analog to digital (A/D) and digital to analog conversion (D/A) circuitry, and input/output circuitry and devices (I/O) and appropriate signal conditioning and buffer circuitry. Each control module has a set of control algorithms, comprising machine-executable code and calibrations resident in the ROM and executable to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25, 50 and 100 milliseconds (msec) during ongoing engine and vehicle operation. Alternatively, algorithms may be executed in response to occurrence of an event.

The invention is embodied and reduced to practice in algorithms in the form of machine-executable code preferably stored in a non-volatile memory device of one of the control modules. The algorithms optimize power loss of the internal combustion engine during an engine operating cycle that includes engine warm-up. This comprises monitoring operating conditions and engine operation. For purposes of this invention, operating conditions comprise ambient conditions of ambient temperature and barometric pressure, and engine operating conditions comprising coolant temperature, temperature of the exhaust aftertreatment system, and, exhaust emissions. Engine control schemes comprise controlling aspects of the engine operation, including the engine speed/torque operating point, i.e., Ni and Ti, the aforementioned engine operating modes (air/fuel ratio mode and the engine temperature management mode), and, the engine state (normal or deactivated engine state). A future energy loss for the engine operating cycle is estimated, and a current power loss and a time-rate of change in the estimated future energy loss for the engine operating cycle are determined over ranges of the engine operation. An engine control scheme is selected that is operative to substantially achieve the operator torque request and minimize the current power loss and the time-rate of change in the estimated future energy loss during the engine warm-up period. The selected engine control scheme is communicated to the ECM or the HCP for implementation. This is now described in detail.

The current engine power loss comprises an estimate of the power loss for the exemplary internal combustion engine at that point in time, operating at the current engine control scheme under current engine operating conditions. This includes monitoring and determining engine operating conditions and engine control to determine an instantaneous power loss, comprising a nominal power loss for the engine operating point and a power loss correction. Determining instantaneous power loss is described in co-pending and co-assigned U.S. patent application Ser. No. 11/737,197, entitled Method and Apparatus to Determine Instantaneous Engine Power Loss for a Powertrain System, which is incorporated by reference in its entirety. This is now described in detail.

Determining the operating conditions comprises monitoring inputs from various engine sensing devices and engine operation to determine engine speed (RPM), engine load (Brake Torque, Nm), barometric pressure, and, engine coolant temperature. Engine air/fuel ratio is typically a commanded parameter and can be measured directly or estimated based upon engine operating conditions. Temperature of the exhaust aftertreatment system (i.e., a catalyst) can be estimated based upon operating conditions, using algorithms embedded in one of the control modules.

The nominal engine power loss is evaluated using Eq. 1, below:

$$P_{LOSS\ ENG} = \dot{m}_{FUEL} \cdot \left(\frac{P_{ENG}}{\dot{m}_{FUEL}}\right)_{MAX} - P_{ENG}; \qquad [1]$$

wherein the first term on the right side of the equation represents the amount of engine power that is expected when the conversion of fuel energy occurs at maximum efficiency. The term $$\left(\frac{P_{ENG}}{\dot{m}_{FUEL}}\right)$$

is a constant term, derived for a specific engine design. The term $P_{ENG}$ comprises the actual power produced by the engine. The difference between the two terms determines the nominal engine power loss.

The nominal power loss is determined based upon the engine operating point, comprising the engine speed and torque. The nominal power loss is preferably determined during each 50 msec engine loop cycle, from a predetermined calibration table, determined for the exemplary engine operating over a range of engine speed and load conditions under nominal engine operating conditions for temperature, barometric pressure and stoichiometric air/fuel ratio (i.e., EQR=1.0). To accurately evaluate the engine power loss the fuel consumption must be estimated across all speeds and loads for all possible operating conditions. Changes in coolant temperature or barometric pressure can significantly affect these values. To account for changes in the nominal power loss because of engine operation at non-standard conditions, the power loss correction, $\Delta P_{LOSS\_ENG}$, is added to the nominal power loss $P_{LOSS\_ENG}$.

The power loss correction, $\Delta P_{LOSS\_ENG}$ is calculated based upon the operating conditions including ambient temperature, and catalyst temperature, barometric pressure, and air/fuel ratio, and executing one of a plurality of embedded polynomial equations which calculates a power loss correction based upon the current actual operating conditions. The power loss correction is determined based upon the speed (Ni) and torque (Ti) originating from the engine. The power loss equation is determined with reference to Eq. 2:

$$\Delta P_{LOSS\_ENG} = C0 + C1*Ti + C2*Ti^2 + C3*Ni + C4*Ni*Ti + C5*Ni*Ti^2C6*Ni^2 + C7*Ni^2*Ti + C8*Ni^2*Ti^2. \qquad [2]$$

The coefficients C0-C8 are preferably calibrated and evaluated using a least squares curve fit derived using engine data generated over the ranges of engine input speeds and loads and the engine control scheme comprising the operating modes and states. Coefficients C0-C8 are generated for the air/fuel ratio operating modes comprising the stoichiometric and the rich operating modes, and the engine temperature modes comprising the warm-up and the warmed up modes. Coefficients C0-C8 are further generated for the engine states of normal engine operation and cylinder deactivation. The coefficients can be stored in arrays within one of the memory devices for each of the operating modes and engine states, for retrieval during the ongoing engine operation.

The power loss correction, $\Delta P_{LOSS\_ENG}$, comprises a sum of a plurality of polynomial equations, as follows.

A power loss related to supplemental fuel necessary for stable engine operation under the current operating conditions is preferably calculated using Eq. 3, as follows:

$$\beta_1(t, T_{CAT}) \cdot \left[\dot{m}_{FUEL} \cdot \left(\frac{P_{ENG}}{\dot{m}_{FUEL}}\right)_{MAX} - P_{ENG}\right] \qquad [3]$$

A power loss related to fueling to optimize HC emissions is preferably calculated using Eq. 4, as follows:

$$\beta_2(t, T_{CAT}) \cdot \left[\dot{m}_{HC\ EMIS} \cdot \left(\frac{P_{ENG}}{\dot{m}_{HC\ EMIS}}\right)_{MAX} - P_{ENG}\right] \qquad [4]$$

A power loss related to fueling to optimize $NO_x$ emissions is preferably calculated using Eq. 5, as follows:

$$\beta_3(t, T_{CAT}) \cdot \left[\dot{m}_{NOx\ EMIS} \cdot \left(\frac{P_{ENG}}{\dot{m}_{NOx\ EMIS}}\right)_{MAX} - P_{ENG}\right] \qquad [5]$$

The power loss related to fueling to effect coolant and engine oil warm-up is preferably calculated using Eq. 6, as follows:

$$\beta_4(t, T_{CAT}) \cdot \frac{dE_{FUEL}(t, T_{COOL})}{dT_{COOL}} \cdot \frac{dT_{COOL}(Ni, Ti, T_{COOL})}{dt} \qquad [6]$$

The power loss related to fueling to effect catalyst warm-up to meet HC emissions is preferably calculated using Eq. 7, as follows:

$$\beta_5(t, T_{CAT}) \cdot \frac{dE_{HC}(t, T_{CAT})}{dT_{CAT}} \cdot \frac{dT_{CAT}(Ni, Ti, T_{CAT})}{dt} \qquad [7]$$

The power loss related to fueling to effect catalyst warm-up to meet $NO_x$ emissions is preferably calculated using Eq. 8, as follows:

$$\beta_6(t, T_{CAT}) \cdot \frac{dE_{NOx}(t, T_{CAT})}{dT_{CAT}} \cdot \frac{dT_{CAT}(Ni, Ti, T_{CAT})}{dt} \qquad [8]$$

The power loss related to fueling to prevent catalyst over-temperature operation is preferably calculated using Eq. 9, as follows:

$$\beta_7(t, T_{CAT}) \cdot \frac{dT_{CAT}(Ni, Ti, T_{CAT})}{dt} \qquad [9]$$

The power loss related to fueling to prevent engine over-temperature operation is preferably calculated using Eq. 10, as follows:

$$\beta_8(t, T_{CAT}, T_{COOL}) \cdot \frac{dT_{COOL}(Ni, Ti, T_{COOL})}{dt} \qquad [10]$$

The terms in Eqs. 3-10 are precalibrated and stored as arrays in memory, based upon the operating conditions and the engine operation and control. $T_{CAT}$ comprises catalyst temperature, typically an estimated value. The term $T_{COOL}$ comprises coolant temperature, typically measured. The terms for $\dot{m}$ for fuel, HC emissions, and $NO_x$ emissions comprise mass fuel flowrates related to fueling and generation of HC and $NO_x$ emissions. The terms $E_{FUEL}$, $E_{HC}$, and $E_{NOX}$ comprise energy losses related to the supplemental fuel and to meet HC and $NO_x$ emissions. The dTcool/dt and dTcat/dt terms are precalibrated terms which vary with the engine speed, torque, and temperature. The dE/dT terms are precalibrated terms which vary with elapsed time and temperature, and are based on off-line energy loss calculations. These values are stored in tables with axes of engine run time and catalyst temperature, or, alternatively in tables with axes of engine run time and coolant temperature.

The coefficients $\beta_1(t, T_{CAT})-\beta_8(t, T_{CAT})$ comprise weighting factors for each of the power loss equations, and are determined for a range of elapsed engine run times, t, since start of the engine, and estimated catalyst temperatures, $T_{CAT}$, and coolant temperatures, $T_{COOL}$. They are preferably calibrated and evaluated using a least squares curve fit using engine data. The coefficients are stored in calibration tables within ROM for various operating conditions and retrievable during the ongoing engine operation. Typically the coefficients are calibrated such that $\beta_1+\beta_2+\beta_3=1$, $\beta_4+\beta_5+\beta_6=1$, $\beta_1=\beta_4$, $\beta_2=\beta_5$, and $\beta_3=\beta_6$. The $\beta_7$ term is a subjective calibration used to penalize engine operation (speed and load) that increase the catalyst temperature when the catalyst temperature is high. Controlling the catalyst temperature using this method reduces or eliminates a need for fuel enrichment conditions commonly used to reduce catalyst temperature. The $\beta_8$ term is a subjective calibration used to penalize engine operation (speed and load) that increase the coolant temperature when the coolant temperature is too high. Linear interpolation is used to determine the coefficients when the operating conditions are between table values.

The Eqs. 3 through 10 are each executed in a form of Eq. 2, with specifically calibrated coefficients C0-C8, and inputs of engine speed and torque. This includes forms of Eqs. 3 through 10 generated for each air/fuel ratio control mode comprising either of the stoichiometric operating mode and the rich operating mode, and each of the engine temperature modes comprising the warm-up mode and the warmed up mode. Coefficients C0-C8 are further generated for each of the engine states comprising normal engine operation ('ALL_CYL'), and engine operation with deactivated cylinders ('DEACT'). The polynomial coefficients C0-C8 are evaluated for each of the equations during ongoing operation and then combined into a single set of coefficients C0-C8 for use with Eq. 2, and are updated at a relatively slow rate of once per second in one of the control modules. The β terms determine the weighting between the different types of engine power loss, as described hereinbelow. The final polynomial equation is evaluated hundreds of times every second as part of the optimization routines that typically run at a much faster rate.

The polynomial equation for power loss reflected in Eqs. 3-10 provides the correction to the standard power loss calculation. Equation derivations and coefficients are determined for the normal operating mode, i.e., all cylinders active, and for cylinder deactivation mode, i.e., half of the cylinders active. These equation derivations and coefficients are further derived for each of a standard and a low barometric pressure, e.g., 100 kPa and 70 kPa. These equation derivations and coefficients are further derived for each of stoichiometric mode of operation and rich operation, e.g., air/fuel equivalence ratio of 1.0 and 0.7. Determining a power loss at a specific engine operating condition can comprise determining power loss using the standard equations and interpolating therebetween to determine power loss at the real-time operating conditions.

This approach allows engine power loss, including complex engine power loss characteristics, to be calculated using a single table lookup for the nominal power loss and executing the polynomial equation for the power loss correction, i.e., Eq. 2, with coefficients C0-C8 determined based upon the current engine control scheme and the operating conditions. The polynomial equation, comprising summing the nominal power loss and results from Eqs. 3 through 10, represents total engine power loss for rapid execution. The final coefficients to the polynomial equation of Eq. 2 are based on precalibrated factors and weighting factors. This determination of the coefficients can be performed at a relatively slow update rate, e.g., once per second. The polynomial equation is used in the optimization routine numerous times before the next update.

System optimization to minimize instantaneous power loss may not achieve a minimum energy loss over an operating cycle, e.g., a period of engine operation between an engine start and an engine stop. Actions to warm-up the engine and the exhaust aftertreatment system may not provide the best short term fuel economy or lowest instantaneous emissions. To minimize fuel consumption and exhaust emissions over a complete cycle, the optimization routine determines the energy loss during the cycle.

The future energy loss comprises the amount of energy required to complete a cycle based upon what the present operating conditions are, as shown by Eq. 11:

$$E_{LOSS\ FUTURE} = \int_t^{t_{MAX}} P_{LOSS\ TOTAL}\, dt. \quad [11]$$

The limits on the integral range from current time, t, to a maximum time, $t_{max}$. During operation, as time, t, increases the value of the integral decreases, i.e., less energy is required to reached the desired outcome of a warmed up engine. This is depicted graphically with reference to FIG. 3, described hereinbelow.

During operation in the engine warm-up mode, minimizing total energy loss comprises operating the engine to minimize the energy loss during the remainder of the operating cycle, e.g., until engine coolant temperature reaches 90° C. or other target temperature. A future energy loss is expressed as follows, in Eq. 12:

$$E_{LOSSFUTURE}(t, T_{COOL}, T_{CAT})=P_{LOSSTOTAL}(t, T_{COOL}, T_{CAT})\cdot\Delta t+E_{LOSSFUTURE}(t+\Delta t, T_{COOL}+\Delta T_{COOL}, T_{CAT}+\Delta T_{CAT}) \quad [12]$$

wherein $T_{COOL}$ and $T_{CAT}$ comprise the coolant and catalyst temperatures. This can be reduced to Eq. 13:

$$\frac{(-\Delta E_{LOSS\ FUTURE})_{T_{COOL}=Const, T_{CAT}=Const}}{\Delta t} = P_{LOSS,TOTAL} + \frac{(\Delta E_{LOSS\ FUTURE})_{t+\Delta t}}{\Delta t} \quad [13]$$

Minimizing the energy loss can be accomplished by minimizing the power loss and the rate of change in the future energy loss. The derivation of Eq. 13, above, can be expressed in continuous form as partial derivatives, as in Eq. 14:

$$-\frac{\partial E}{\partial t} = P_{LOSS\ TOTAL} + \frac{\partial E}{\partial T_{COOL}} \cdot \frac{dT_{COOL}}{dt} + \frac{\partial E}{\partial T_{CAT}} \cdot \frac{dT_{CAT}}{dt}; \quad [14]$$

wherein the partial derivatives are derived for a changes in energy based upon coolant temperature and based upon catalyst temperature, wherein $$\frac{\partial E}{\partial T_{COOL}}$$

comprises a precalibrated factor stored as an array in memory and determined as a function of engine operating time and coolant temperature, using discrete coolant temperatures, ranging from cold, e.g., −30° C., to warmed up, e.g., 90° C. The calibration values for the engine are developed using a standardized engine and vehicle test procedure. The term $$\frac{dT_{COOL}}{dt}$$

comprises a precalibrated polynomial equation, based upon Eq. 2, for a change in coolant temperature based upon time. There is a plurality of polynomial equations for the $$\frac{dT_{COOL}}{dt}$$

term, selected during ongoing operation based upon the engine states comprising normal engine operation and engine operation with deactivated cylinders. Furthermore, there are polynomial equations developed for discrete coolant temperatures, ranging from cold, e.g., −30° C., to warmed up, e.g., 90° C. The polynomial equations are developed using heat rejection data and a thermal model of the engine to predict warm-up rate of the coolant. The dTcat/dt term represents a precalibrated value for change in catalyst temperature based upon time for the specific vehicle and system application.

The rate of change in the estimated future energy loss during the engine warm-up is determined by calculating the rate of change in the future energy loss based upon Eq. 14, above, and determining an engine operating point comprising a minimum value for the total engine power loss, $P_{LOSSTOTAL}$, based upon a combination of instantaneous power loss and rate of change in the future energy loss.

Figure 2:
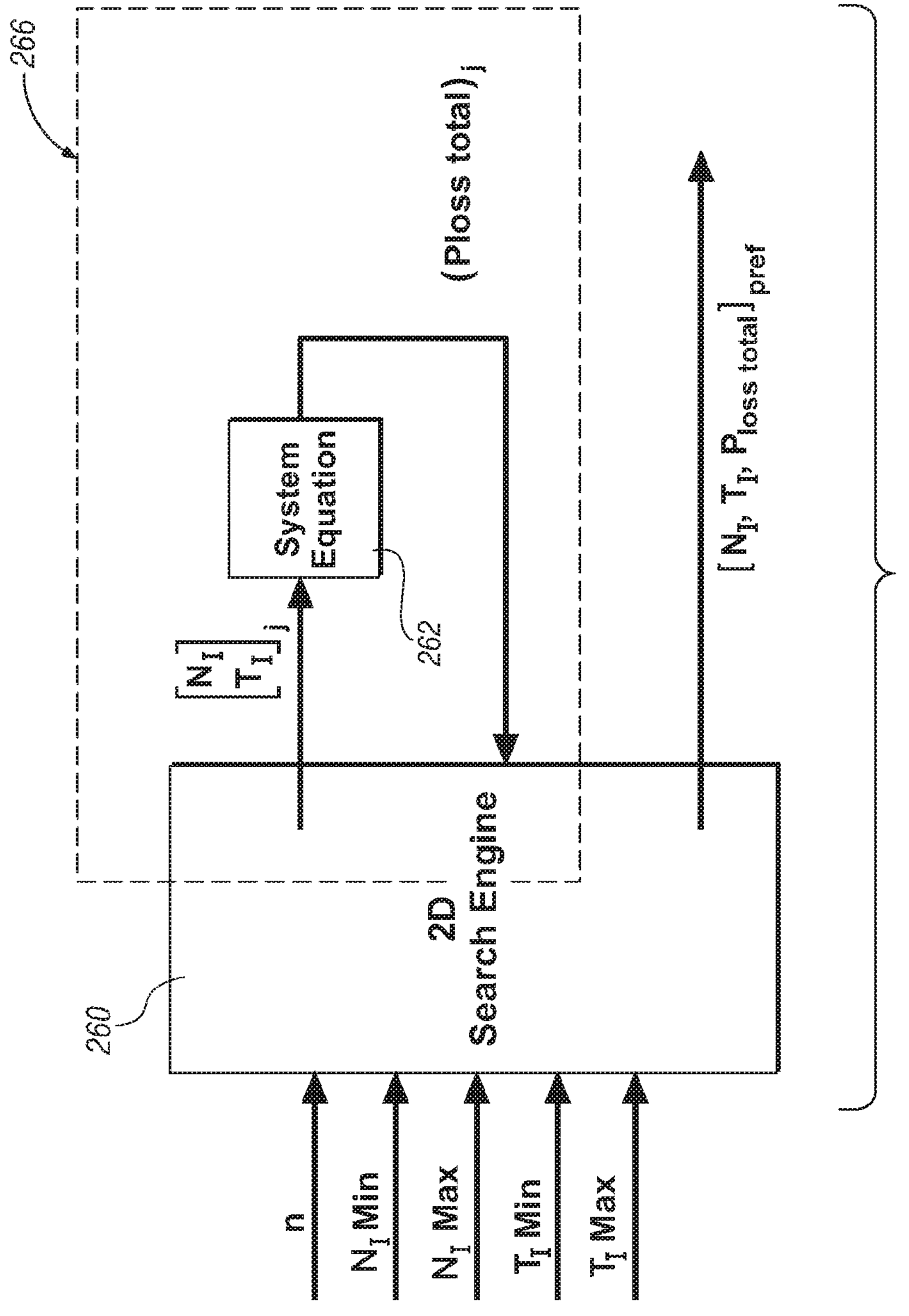
FIG. 2 is a schematic depiction, in accordance with the present invention; and, FIG. 3 is a graphical depiction, in accordance with the present invention.

Referring now to FIG. 2, a minimization routine is depicted for determining a minimum value for the total engine power loss, $P_{LOSSTOTAL}$, in accordance with the embodiment of the invention. The minimization routine is executed to determine a preferred engine control scheme which minimizes the power loss. The minimization routine preferably comprises execution of a two-dimensional search engine 260 ("2D Search Engine") which has been encoded in one of the control modules. The two-dimensional search engine 260 iteratively generates a plurality of engine operating states over ranges of allowable engine operating states for execution in an iterative loop 266. The engine operating states comprise engine speed and engine torque $[N_I, T_I]_j$ and the ranges comprise engine speeds and engine torques $N_I$Min, $N_I$Max, $T_I$Min, $T_I$Max. The ranges of engine speeds and engine torques can comprise achievable engine speeds and torques, e.g., from engine idle operation to engine red-line operation, or may comprise a subset thereof wherein the ranges are limited for reasons related to operating characteristics such as noise, vibration, and harshness. The subscript "j" refers to a specific iteration, and ranges in value from 1 to n. The quantity of iterations, n, can be generated by any one of a number of methods, either internal to the search engine, or as a part of the overall method. The parametric values for engine speed and engine torque $[N_I, T_I]_j$ are input to a system equation 262, from which a value for total engine power loss $(P_{LOSS\ TOTAL})_j$ is determined. The system equation 362 preferably comprises an algorithm which executes Eq. 1 and Eq. 2, above having coefficients C0-C8 derived as described hereinabove.

The total power loss, $P_{LOSS\ TOTAL}$ determined for each iteration is returned and captured, or analyzed, in the search engine 260, depending upon specifics of the search engine. The search engine iteratively evaluates parametric values for the total power loss, $(P_{LOSS\ TOTAL})_j$ and selects new values for $[N_I, T_I]$ based upon feedback to search for a minimum total power loss. The search engine 260 identifies preferred values for $[N_I, T_I]$ at a preferred power loss, i.e., the minimum total power loss, $(P_{LOSS\ TOTAL})_j$ derived from all the iteratively calculated parametric values. The preferred total power loss and corresponding values for input speed and input torque, $[N_I, T_I, P_{LOSS\ TOTAL}]_{PREF}$ are output to one of the control modules for implementation or further evaluation.

As previously mentioned, there is a plurality of power loss correction polynomial equations, each executable within one of the control modules. In the exemplary embodiment, there are eight polynomial equations, derived for combinations of engine control schemes comprising: air/fuel ratio control modes of rich and stoichiometric, i.e., an air/fuel equivalence ratio of about 0.7 (rich) and 1.0 (stoichiometry); normal and cylinder deactivation states; and, engine operating temperature comprising the warm-up mode and the warmed-up mode, i.e., coolant temperature at or about 90° C. In operation, the engine system monitors ongoing operation, including engine speed (RPM), load (brake torque or NMEP in N-m), barometric pressure, coolant temperature, and air/fuel ratio.

The operation of the system requires preproduction system calibration. Typically this comprises operating a representative engine and vehicle under known, repeatable vehicle operating conditions at normal engine operating conditions to obtain a baseline. The engine can then be tested with all cylinders operating and in the deactivation mode, and at stoichiometric operation and rich operation, and in a warmed up mode and in a warm-up mode. An engine torque and airflow model is preferably used to evaluate fuel consumption for non-standard conditions, e.g., low coolant temperature and/or barometric pressure. The engine can be tested at various coolant temperatures and barometric pressures to verify fuel consumption correction and to measure emissions. Engine heat rejection data and a thermal model of the engine can be used to predict coolant warm-up rate, and verified with vehicle testing. Similarly, a known mathematical model can be used to generate calibration tables.

Figure 3:
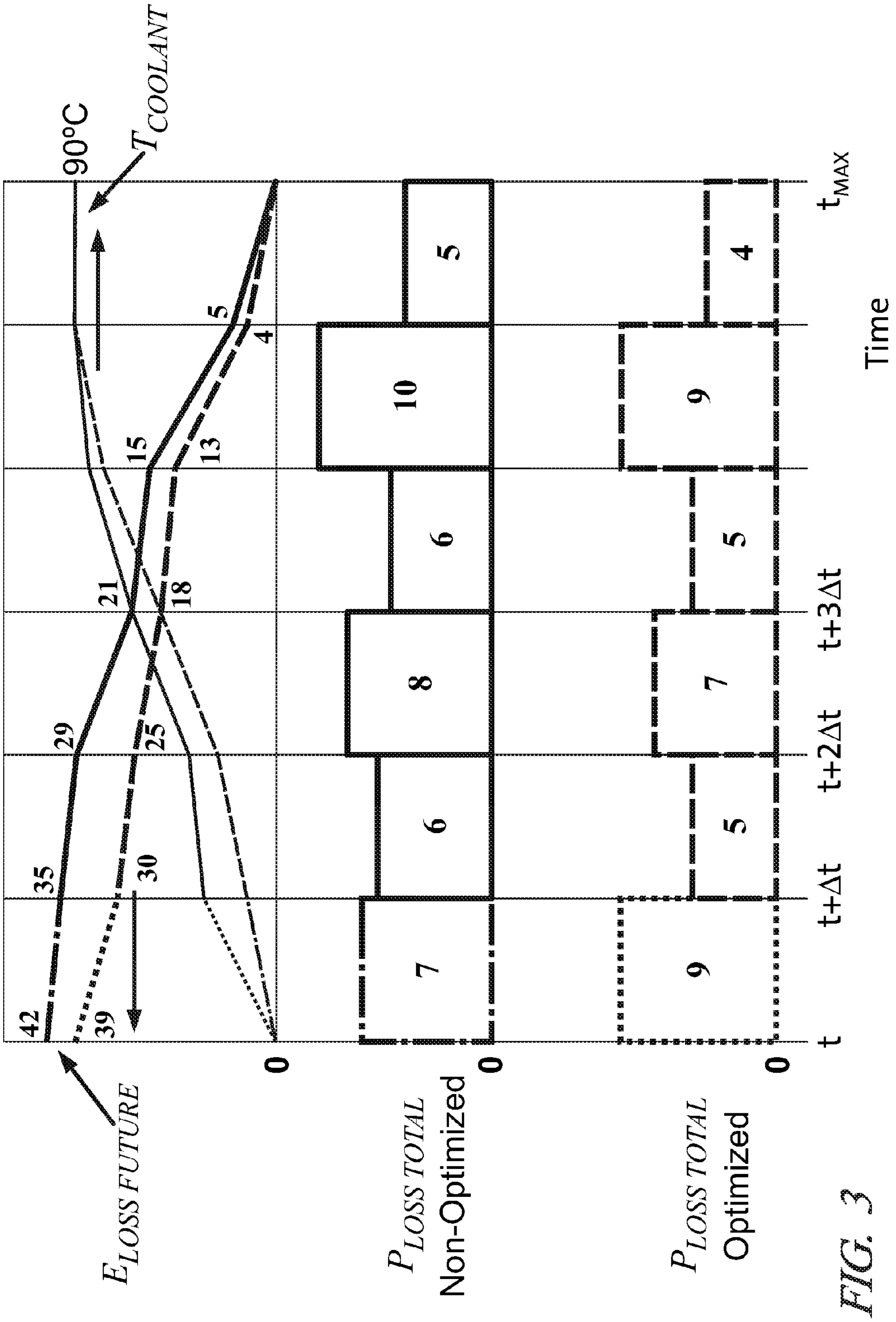

Referring now to FIG. 3, performance results of operating the exemplary system during engine warm up are depicted graphically. These results are based upon system modeling using an engine operated under non-optimized operation, and the same engine operated under optimized operation using the control scheme described hereinabove. The results depict engine coolant temperature, $T_{COOL}$, future energy loss $E_{LOSSFUTURE}$, and total power loss, $P_{LOSSTOTAL}$ which result from operating the engine during engine warm-up over a predetermined engine operating cycle. Operation using the optimized control scheme results in an initial greater total power loss, depicted as $P_{LOSSTOTAL}$ of nine units of power for the optimized operation, compared to seven units of power for the non-optimized operation during the period of time between 't' and 't+Δt'. However, the overall lower energy cost to achieve warmed up engine coolant temperature results in an lesser total energy loss, depicted as 39 units of energy for the optimized operation, compared to 42 units of energy for the non-optimized operation during the period of time between 't' and '$t_{MAX}$', which is indicative of the coolant temperature attaining 90° C.

It is understood that modifications in the hardware are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture, comprising a storage medium having machine-executable program encoded therein to minimize energy loss of an internal combustion engine, the program comprising:

code to monitor engine operating conditions;

code to estimate a future energy loss;

code to determine a power loss and a rate of change in the estimated future energy loss;

code to determine an engine operating point which minimizes the power loss and the rate of change in the estimated future energy loss during engine warm-up; and, code to operate the engine at the engine operating point which minimizes the power loss and the rate of change in the estimated future energy loss during engine warm-up.

2. The article of manufacture of claim 1, wherein the code to determine the engine operating point which minimizes the power loss during engine warm-up comprises:

code to execute a two-dimensional search engine to iteratively generate a plurality of engine speed and torque states;

code to calculate a power loss and a rate of change in the estimated future energy loss for each of the iteratively generated engine speed and torque states; and, code to identify preferred engine speed and torque states to minimize the power loss during the engine warm up.

3. The article of manufacture of claim 2, wherein the code to operate the engine at the operating point which minimizes the power loss and the rate of change in the estimated future energy loss during engine warm-up further comprises code to control operation of the engine at the identified preferred engine speed and torque states.

4. The article of manufacture of claim 3, wherein the code to operate the engine at the operating point further comprises code to control one of an engine air/fuel ratio mode, an engine cylinder activation state, and, an engine operating temperature mode.

5. The article of manufacture of claim 1, wherein the code to calculate a rate of change in the estimated future energy loss during engine warm-up comprises: code to determine a change in energy based upon engine coolant temperature factored by a time-rate change in the engine coolant temperature.

6. The article of manufacture of claim 5, wherein the change in energy based upon engine coolant temperature and the time-rate change in the engine coolant temperature comprise predetermined calibration values selected based upon elapsed time of engine operation and the coolant temperature.

7. The article of manufacture of claim 1, wherein the code to determine the power loss comprises: code to determine a nominal power loss and a power loss correction based upon engine operating conditions.

8. The article of manufacture of claim 7, wherein the engine operating conditions comprise at least one of barometric pressure, engine temperature, exhaust emissions, and catalyst temperature.

9. The article of manufacture of claim 7, wherein the code to determine the power loss correction is further based upon an engine air/fuel ratio mode, an engine cylinder activation state, and, an engine operating temperature mode.

10. The article of manufacture of claim 1, further comprising a storage medium having machine-executable program encoded therein to minimize energy loss of the internal combustion engine adapted to transmit torque to an electromechanical transmission.

11. The article of manufacture of claim 10, wherein the electromechanical transmission comprises first and second electric machines adapted to transmit torque thereto.

12. The article of manufacture of claim 11, further comprising the internal combustion engine and first and second electrical machines and the electro-mechanical transmission selectively operative to transmit torque therebetween to substantially meet an operator request for torque output from the transmission.

13. Article of manufacture, comprising a storage medium having machine-executable code stored therein to minimize energy loss during warm-up of an internal combustion engine operative to transmit torque to an electro-mechanical transmission, the code comprising:

code to estimate a future energy loss;

code to determine a power loss and a rate of change in the estimated future energy loss; and, code to execute an engine control scheme to minimize the power loss and the rate of change in the estimated future energy loss during the engine warm-up, the engine control scheme comprising one of an engine air/fuel ratio mode, an engine cylinder activation state, and, an engine operating temperature mode.

14. The article of claim 13, wherein the engine control scheme to minimize the power loss during engine warm-up further comprises:

code to execute a two-dimensional search engine to iteratively generate a plurality of engine speed and torque states;

code to calculate a power loss and a rate of change in the estimated future energy loss for each of the iteratively generated engine speed and torque states; and, code to identify preferred engine speed and torque states operative to minimize the power loss.

15. Method to minimize energy loss of an internal combustion engine adapted to transmit torque to an electromechanical transmission, the internal combustion engine and the electromechanical transmission selectively operative to transmit torque therebetween, comprising:

monitoring engine operating conditions;

estimating a future energy loss;

determining a power loss and a rate of change in the estimated future energy loss;

determining an engine control scheme operative to minimize the power loss and the rate of change in the estimated future energy loss during engine warm-up; and, executing the engine control scheme to minimize the power loss and the rate of change in the estimated future energy loss during engine warm-up.

16. The method of claim 15, wherein determining the engine control scheme operative to minimize the power loss during engine warm-up comprises:

iteratively generating a plurality of engine speed and torque states;

calculating a power loss and a rate of change in the estimated future energy loss for each of the iteratively generated engine speed and torque states; and, identifying engine speed and torque states which minimize the power loss.

17. The method of claim 16, wherein calculating a power for the internal combustion engine comprises:

determining engine operating conditions;

determining a nominal power loss and a power loss correction based upon barometric pressure, engine temperature, air/fuel ratio, and catalyst temperature; the power loss correction determinable for: an engine air/fuel ratio mode, an engine cylinder activation state, and, an engine operating temperature mode.

18. The method of claim 17, wherein the power loss correction further comprises:

the engine air/fuel ratio mode comprising one of a stoichiometric and a rich operation;

the engine cylinder activation state comprising one of a normal and a deactivation state; and, the engine operating temperature mode comprising one of a warm-up and a warmed-up mode.

* * * * *